United States Patent
Kuffner, Jr. et al.

(10) Patent No.: US 9,904,287 B1
(45) Date of Patent: Feb. 27, 2018

(54) SYSTEMS AND METHODS FOR MITIGATING VIGILANCE DECREMENT WHILE MAINTAINING READINESS USING AUGMENTED REALITY IN A VEHICLE

(71) Applicant: Toyota Research Institute, Inc., Los Altos, CA (US)

(72) Inventors: James J. Kuffner, Jr., Sunnyvale, CA (US); Gill A. Pratt, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/586,347

(22) Filed: May 4, 2017

(51) Int. Cl.
| | |
|---|---|
| *G01C 22/00* | (2006.01) |
| *G05D 1/00* | (2006.01) |
| *B60W 30/182* | (2012.01) |
| *B60W 40/09* | (2012.01) |
| *B60R 1/00* | (2006.01) |
| *G06T 19/00* | (2011.01) |

(52) U.S. Cl.
CPC ............ *G05D 1/0061* (2013.01); *B60R 1/00* (2013.01); *B60W 30/182* (2013.01); *B60W 40/09* (2013.01); *G05D 1/0088* (2013.01); *G06T 19/006* (2013.01); *B60R 2300/205* (2013.01); *B60R 2300/8086* (2013.01); *B60W 2540/30* (2013.01); *B60W 2900/00* (2013.01)

(58) Field of Classification Search
CPC ...... G05D 1/0061; G05D 1/0088; B60R 1/00; B60W 30/182; B60W 40/09; G06T 19/006
USPC .................... 701/23, 400–541; 340/988–996
See application file for complete search history.

(56) References Cited

U.S. PATENT DOCUMENTS

| | | | | |
|---|---|---|---|---|
| 7,982,620 | B2* | 7/2011 | Prokhorov | B60K 28/066 340/576 |
| 9,523,984 | B1* | 12/2016 | Herbach | B62D 15/025 |
| 2004/0044293 | A1* | 3/2004 | Burton | A61B 5/18 600/544 |
| 2012/0224060 | A1* | 9/2012 | Gurevich | B60R 1/00 348/148 |

(Continued)

FOREIGN PATENT DOCUMENTS

WO 2017/053616 A1 3/2017

OTHER PUBLICATIONS

SAE-Level2.*

(Continued)

*Primary Examiner* — Muhammad Shafi
(74) *Attorney, Agent, or Firm* — Chirstopher G. Darrow; Darrow Mustafa PC

(57) ABSTRACT

System, methods, and other embodiments described herein relate to mitigating vigilance decrement of a vehicle operator. In one embodiment, a method includes monitoring the operator by collecting operator state information using at least one sensor of the vehicle. The method includes computing an engagement level of the operator according to a vigilance model and the operator state information to characterize an extent of vigilance decrement presently experienced by the operator. The method includes rendering, on an augmented reality (AR) display, at least one graphical element as a function of the engagement level to induce the operator to maintain vigilance with respect to operation of the vehicle and a present operating environment around the vehicle.

17 Claims, 10 Drawing Sheets

(56) References Cited

U.S. PATENT DOCUMENTS

2013/0249942 A1\* 9/2013 Green ........................ G06F 3/14
  345/633
2017/0161949 A1\* 6/2017 Seder ................. G02B 27/0093
2017/0240096 A1\* 8/2017 Ross ........................ B60Q 1/26
2017/0240098 A1\* 8/2017 Sweeney .............. B60Q 1/2611

OTHER PUBLICATIONS

UBI Mobility, "How Augmented Reality Can Help Us Accept Autonomous Cars", printed from http://www.ubimobility.org/how-augmented-reality-can-help-us-accept-autonomous-cars/ on Apr. 19, 2017 in 4 pages.

\* cited by examiner

SYSTEMS AND METHODS FOR MITIGATING VIGILANCE DECREMENT WHILE MAINTAINING READINESS USING AUGMENTED REALITY IN A VEHICLE

TECHNICAL FIELD

The subject matter described herein relates in general to systems and methods for monitoring and preventing/mitigating vigilance decrement and, more particularly, to using augmented reality (AR) within a vehicle to maintain engagement of a vehicle operator.

BACKGROUND

Autonomous vehicles can sense a surrounding environment (e.g., obstacles, roadway, etc.) and navigate autonomously through the surrounding environment without human input or at least partially without human input. That is, autonomous vehicles can operate according to different levels of autonomy. For example, an autonomous vehicle can operate according to the Society of Automotive Engineers (SAE) Level 2 classification for autonomous driving. In this autonomous operating mode, an autonomous vehicle relies, at least in part, on handovers from autonomous operation to manual control by a vehicle operator when the vehicle cannot or should not autonomously operate due to various circumstances.

However, whether initiated by the vehicle or through intervention from an operator, handovers can occur without much notice. Therefore, to reliably accomplish handovers, an operator generally should maintain both readiness to act, should the autonomy disengage, and vigilance to supervise and selectively take action when the autonomy of the vehicle fails to detect a dangerous situation.

Ensuring readiness and vigilance of the operator presents various difficulties. For example, because the vehicle can operate for extended periods without manual input from the operator under level 2 autonomy, operators can stop paying attention to the environment around the vehicle and begin daydreaming, engaging in unrelated tasks, and so on. Moreover, approaches such as audible alerts can be an annoyance to the operator instead of an effective guarantor of engagement. Furthermore, approaches that require an operator to keep their hands on the steering wheel and/or to maintain their eyes forward-facing can also be ineffective since the operator may engage in the noted postures to simply satisfy the monitoring system while still daydreaming or focusing on other tasks. Consequently, the noted approaches fail to maintain both readiness and vigilance of a vehicle operator.

SUMMARY

An example of a vigilance system for mitigating vigilance decrement is presented herein. Vigilance decrement, in the context of operating a vehicle, generally refers to a tendency of a vehicle operator to become disengaged from a surrounding environment over time when not physically engaged and, thus, less aware of aspects surrounding the vehicle and aspects that possibly affect the operation of the vehicle when the vehicle is operating autonomously. Accordingly, in one embodiment, the vigilance system is implemented in a vehicle that operates autonomously (e.g., SAE level 2) to facilitate keeping the operator engaged with aspects of the driving task and the surrounding environment. Moreover, the vigilance system is, for example, implemented within the vehicle along with further systems such as operator monitoring systems (e.g., cameras for eye-tracking), an augmented reality (AR) system, and so on. Therefore, in one embodiment, the vigilance system simultaneously monitors an operator of the vehicle and controls an augmented reality display to render different visuals that induce the operator to be both vigilant of a possible need to take control from the autonomous system, and ready to control the vehicle should the autonomous systems execute a handover to manual control.

In one embodiment, a system for mitigating vigilance decrement of an operator in a vehicle is disclosed. The system includes one or more processors and a memory that is communicably coupled to the one or more processors. The memory stores a monitoring module that includes instructions that when executed by the one or more processors cause the one or more processors to monitor the operator by collecting operator state information using at least one sensor of the vehicle. The memory stores a vigilance module including instructions that when executed by the one or more processors cause the one or more processors to compute an engagement level of the operator according to a vigilance model and the operator state information to characterize an extent of vigilance decrement presently experienced by the operator. The memory stores a rendering module including instructions that when executed by the one or more processors cause the one or more processors to render, on an augmented reality (AR) display in the vehicle, at least one graphical element as a function of the engagement level to induce the operator to maintain vigilance with respect to autonomous operation of the vehicle and a present operating environment around the vehicle.

In one embodiment, a non-transitory computer-readable medium for mitigating vigilance decrement of an operator in a vehicle is disclosed. The computer-readable medium stores instructions that when executed by one or more processors cause the one or more processors to perform the disclosed functions. The instructions include instructions to monitor the operator by collecting operator state information using at least one sensor of the vehicle. The instructions include instructions to compute an engagement level of the operator according to a vigilance model and the operator state information to characterize an extent of vigilance decrement presently experienced by the operator. The instructions include instructions to render, on an augmented reality (AR) display in the vehicle, at least one graphical element as a function of the engagement level to induce the operator to maintain vigilance with respect to the operation of the vehicle and a present operating environment around the vehicle.

In one embodiment, a method of mitigating vigilance decrement of an operator in a vehicle with an augmented reality (AR) display is disclosed. The method includes monitoring the operator by collecting operator state information using at least one sensor of the vehicle. The method includes computing an engagement level of the operator according to a vigilance model and the operator state information to characterize an extent of vigilance decrement presently experienced by the operator. The method includes rendering, on the AR display, at least one graphical element as a function of the engagement level to induce the operator to maintain vigilance with respect to the autonomous operation of the vehicle and a present operating environment around the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with mitigating vigilance decrement and assuring readiness within a vehicle operator by using an augmented reality (AR) display to engage the vehicle operator are disclosed. As mentioned previously, an operator can become disengaged from surroundings of the vehicle and aspects relating to operation of the vehicle when the vehicle operates autonomously. Thus, the operator can suffer from vigilance decrement as the vehicle continues to operate autonomously since the operator need not be engaged with what the vehicle is doing for the vehicle to continue operating. In general, the vigilance decrement of the operator is a deterioration in the ability to remain vigilant (e.g., alert, watchful, etc.) for events occurring around the vehicle as time progresses. Thus, within the context of an autonomous vehicle, the vigilance decrement relates to a tendency of a vehicle operator to become disengaged from operating the vehicle over time when not actively controlling/operating the vehicle. Consequently, because of the vigilance decrement, the vehicle operator may not be sufficiently engaged with the operation of the vehicle to manually intervene and initiate a handover when the autonomy should not control the vehicle. Similarly, when the vehicle is operating autonomously and performs a handover to manual control, the vehicle operator can lack the appropriate readiness to control the vehicle because of becoming disengaged from the driving tasks and the present operating environment of the vehicle.

Thus, in one embodiment, the vigilance system is implemented in a vehicle that operates autonomously (e.g., SAE level 2) to facilitate keeping the operator engaged with aspects of the driving task and the present operating environment. Moreover, the vigilance system is, for example, implemented within the vehicle along with further systems such as operator monitoring systems (e.g., cameras for eye-tracking), an augmented reality (AR) system, and so on. In one embodiment, the vigilance system simultaneously monitors an operator of the vehicle, computes an engagement level of the operator, and controls an augmented reality display to render different visuals. In this way, the vigilance system can induce the operator to be both vigilant to intervene with the operation of the vehicle when judged appropriate by the operator for a particular circumstance and ready to control the vehicle should the autonomous systems execute a handover to manual control. In other words, by providing an experience to the operator through the AR system that is generated as a function of a present engagement level of the operator, the vigilance system can facilitate preventing the operator from experiencing vigilance decrement and cause the operator to maintain engagement with the vehicle to improve a likelihood that the operator is vigilant and ready to control the vehicle.

Figure 1:
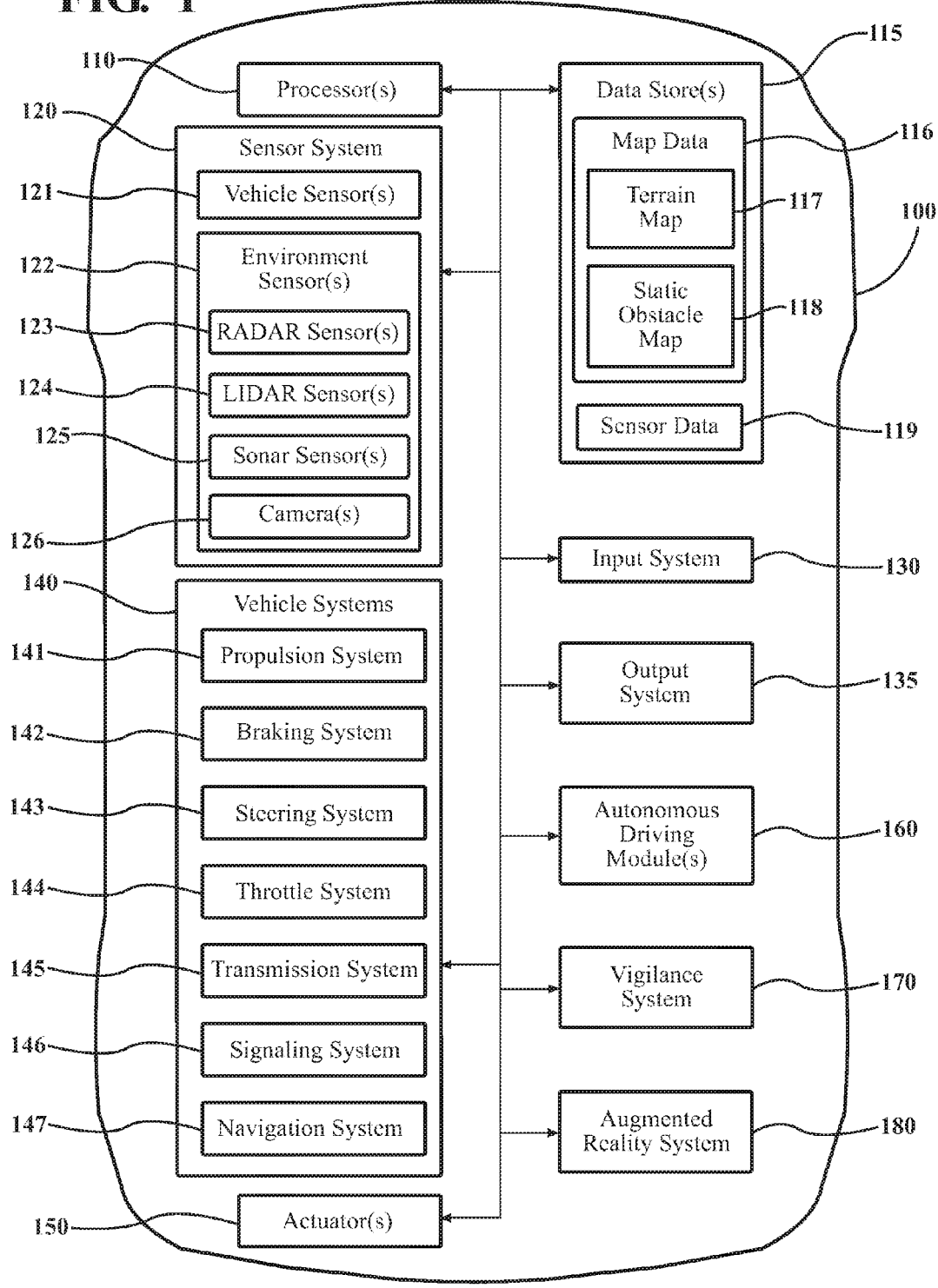
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously, includes an augmented reality (AR) system or capabilities to support an AR system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vigilance system 170 that is implemented to perform methods and other functions as disclosed herein relating to mitigating vigilance decrement and promoting engagement by a vehicle operator. Additionally, an augmented reality system 180 is illustrated as an additional aspect of the vehicle 100. However, it should be noted that while the AR system 180 is illustrated as a sub-component of the vehicle 100, in various embodiments, the AR system 180 can be partially integrated with the vehicle or separate from the vehicle 100. Thus, in one or more embodiments, the AR system 180 can communicate via a wired or wireless connection with the vehicle 100 to correlate functionality as discussed herein. Moreover, the AR system 180 can include one or more displays (e.g., integrated or mobile) within which to display graphic elements to the operator and/or passengers.

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the vigilance system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Figure 2:
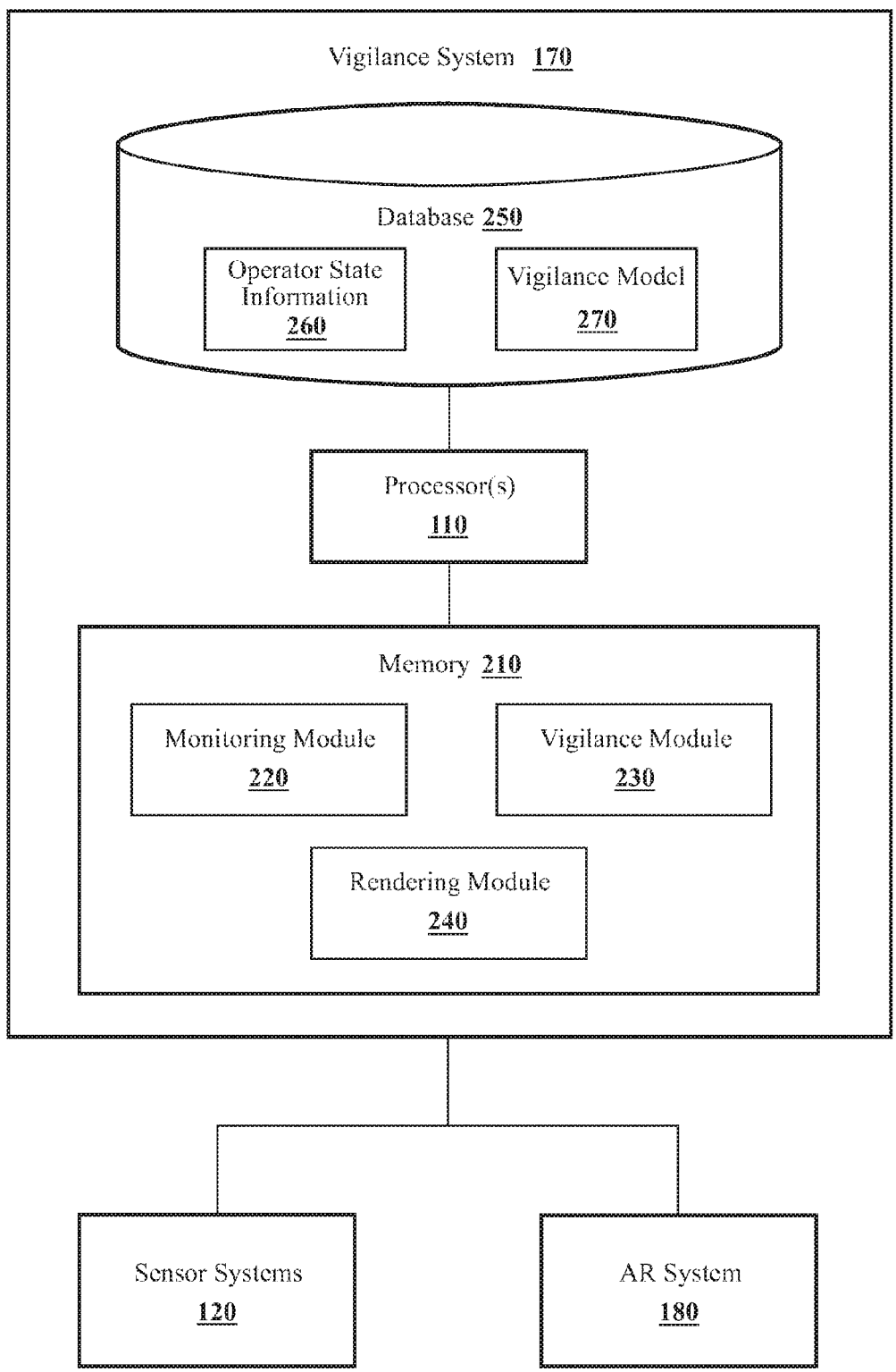
FIG. 2 illustrates one embodiment of a vigilance system that is associated with inducing an operator of a vehicle to be engaged with driving tasks.

With reference to FIG. 2, one embodiment of the vigilance system 170 of FIG. 1 is further illustrated. The vigilance system 170 is shown as including a processor 110 from the vehicle 100 of FIG. 1. Accordingly, the processor 110 may be a part of the vigilance system 170, the vigilance system 170 may include a separate processor from the processor 110 of the vehicle 100, or the vigilance system 170 may access the processor 110 through a data bus or another communication path. In one embodiment, the vigilance system 170 includes a memory 210 that stores a monitoring module 220, a vigilance module 230, and a rendering module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

Accordingly, the monitoring module 220 generally includes instructions that function to control the processor 110 to retrieve data from sensors of a sensor system 120 of the vehicle 100. In other words, the monitoring module 220 includes instructions to acquire operator state information 260 that characterizes a present mental state of the operator, present actions of the operator, where a gaze of the operator may be directed, autonomic responses of the operator, biological responses/conditions of the operator, and so on. It should be appreciated that the present disclosure provides an exemplary listing of aspects associated with the operator that can be monitored to produce the operator state information 260; however, this listing is not to be construed as limiting and is provided as an exemplary list of possibilities for purposes of this discussion.

Accordingly, by way of example, the operator state information 260 can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the operator in the vehicle 100 (e.g., forward-facing, rear-facing, etc.), seat position, rate of movement, facial feature movements (e.g., mouth, blinking eyes, moving head, etc.), and so on.

Additionally, the monitoring module 220 can determine the operator state information 260 in multiple different ways depending on a particular implementation. In one embodiment, the monitoring module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the operator and/or aspects related to the operator. Furthermore, the sensor system 120 can include multiple redundant ones of the sensors in order to, for example, improve accuracy/precision of collected operator state information 260.

With continued reference to the vigilance system 170, in one embodiment, the system 170 includes the database 250. The database 250 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 250 stores data used by the modules 220, 230, and 240 in executing various functions. In one embodiment, the database 250 includes the operator state information 260 collected by the monitoring module 220 in addition to further data used by the vigilance system 170 such as the vigilance model 270.

The vigilance module 230, in one embodiment, generally includes instructions that function to control the processor 110 to compute an engagement level from the operator state information 260. That is, the vigilance module 230 uses the operator state information 260 to characterize whether the operator is presently engaged with the vehicle 100 and the present operating environment of the vehicle 100. In general, the engagement level is a quantization of an extent to which the operator is engaged with how the autonomous driving module 160 is autonomously controlling the vehicle 100 and is aware of situational/contextual information about operation of the vehicle 100. Accordingly, the vigilance module 230 can generate the engagement level as an assessment of a present mental state of the operator in relation to whether the operator is engaged and aware of the operation of the vehicle 100 and, for example, may not indicate whether the operator is physically ready/positioned to manually control the vehicle 100. However, in further embodiments, the vigilance module 230 can compute the engagement level to account for both the present mental state of the operator and a readiness of the operator to manually control the vehicle 100.

Thus, by way of a brief example, the vigilance module 230 can, for example, electronically access the operator state information 260 including information about a gaze of the operator. As such, the vigilance module 230 assesses the information about a gaze of the operator and, more particularly, a duration for which the operator has been gazing in a particular location/direction. From this assessment and according to, for example, the vigilance model 270, the vigilance module 230 can characterize the engagement of the operator and whether the operator is vigilant and ready to assume manual control of the vehicle 100. For example, the vigilance module 230 considers whether the gaze is directed toward the roadway in the front of the vehicle 100, whether the gaze is tracking objects around the vehicle 100, whether the gaze is checking instrument readings, and so on. From this assessment, the vigilance module 230 uses the vigilance model 270 to generate the engagement level. Thus, the vigilance model 270 informs the vigilance module 230 about a likelihood of the operator being engaged according to the various noted aspects of the gaze.

In further aspects, the vigilance module 230 can undertake a more complex analysis in order to compute the engagement level. For example, the vigilance module 230 can correlate a direction of the gaze with further information from the sensor system 120 such as a presence/location of different objects and a relation of the different objects (e.g., cars moving toward vs. away) to the vehicle 100. Additionally, the vigilance module 230 can further consider dynamic vehicle data when computing the engagement level. In one embodiment, the dynamic vehicle data can include various aspects of the vehicle 100 and external environmental aspects relating to the present operating environment. For example, the dynamic vehicle data can include GPS coordinates of the vehicle 100, vehicle telematics, roadway types (e.g., highway vs city), terrain characteristics (e.g., flat/plain surroundings vs feature-filled), duration of travel, weather conditions, time of day, level of traffic, current speed, infotainment information (e.g., whether a radio is playing, etc.), temperature, number of passengers, and other data collected by the monitoring module 220 from different sensors and systems of the vehicle 100. In general, reference to the present operating environment of the vehicle 100 as used herein relates to information about the environment surrounding the vehicle 100, objects in the environment, and an effect of the operation of the vehicle 100 on the environment and the objects.

Additionally, the vigilance module 230 can use data from various sensors including the LIDAR 124, the radar 123, the cameras 126 (e.g., internal and external cameras), the sonar 125, navigation system 147, and so on. In one embodiment, the vigilance module 230 can further electronically access and use information from the autonomous driving module 160 about trajectories of objects in the present operating environment, potential hazards, current decision state information associated with autonomous operation/controls/path planning, and so on.

Thus, to compute the engagement level, the vigilance module 230, in one embodiment, analyzes the operator state information 260 along with the additional information (e.g., the dynamic vehicle data) to quantize an extent of engagement (e.g., mental state/vigilance and/or readiness) by the operator. In general, the vigilance module 230 identifies the various data elements in relation to the vigilance model 270, which provides, for example, likelihoods of operator engagement according to the separate data elements. Subsequently, the vigilance module 230 can combine the individual likelihoods according to defined weightings to produce an overall likelihood. Consequently, the vigilance module 230 can provide the overall likelihood as the engagement level or apply further analysis using the overall likelihood so that the engagement level is further customized according to the present operating environment of the vehicle 100 by, for example, translating the likelihood into a particular classification (e.g., 0-10) according to aspects (e.g., a degree of skill/awareness needed to navigate current surroundings) of the present operating environment.

In further embodiments, the vigilance module 230 in combination with the vigilance model 270 form a computational model such as a machine learning logic, deep learning logic, a neural network model, or another similar approach. In either case, the vigilance module 230, when implemented as a neural network model or another computational model, in one embodiment, electronically processes the operator state information 260 and other electronic data (e.g., dynamic vehicle data) as inputs to the vigilance model 270. Accordingly, the vigilance module 230 in concert with the vigilance model 270 produce the engagement level as an electronic output that characterizes an extent of engagement of the operator as, for example, a single electronic value.

It should be appreciated that while the engagement level is discussed as a single value, in general, the engagement level embodies both vigilance of the operator in relation to supervising the autonomous operation of the vehicle 100 and readiness of the operator to control the vehicle 100 in the event of the autonomous driving module 160 executing a handover to manual control. Thus, in further implementations, the vigilance module 230 produces the engagement level with multiple electronic values that characterize different aspects of the operator state (e.g., mental state and physical state) and the extent to which the operator is presently engaged with driving tasks of the vehicle 100 and the present operating environment. For example, the engagement level can include sub-components identifying particular aspects of what the operator is presently engaged with, an extent to which the operator is engaged with other devices/tasks, where the operator is most likely to gaze if graphics are rendered within the AR display, whether the operator is actively supervising operation of the vehicle 100 but not ready to manually control the vehicle 100 (e.g., holding an ice cream cone in each hand while watching operation of the vehicle 100), and so on.

Additionally, while the use of many different sources and forms of data are described as being part of how the vigilance module 230 computes the engagement level, in various embodiments, the particular data can vary according to different aspects of the implementation. In any case, the present examples are intended for purposes of illustration and should not be construed as a limiting form of the disclosed data elements and functions. Moreover, it should be appreciated that the discussed operator state information 260 and additionally discussed electronic data can be, in one embodiment, collected and used to train the vigilance model 270.

That is, the operator state information 260, the dynamic vehicle data, induced responses of the operator, and other data can be collected and stored while the vehicle 100 is operating. Thereafter, the vigilance system 170, in one embodiment, can communicate the collected information to an OEM or another central collection point to be used in training the model 270. In further embodiments, the vigilance system 170 can use the collected information as a training data set to update or otherwise customize/improve the vigilance model 270 in relation to particularities of the operator of the vehicle 100. Thus, in one embodiment, the vigilance system 170 further trains the model 270 using the operator state information 260 and dynamic vehicle data as electronic inputs and by providing feedback to the model according to logged responses of the operator and/or logged engagement levels computed by the vigilance module 230. In this way, the vigilance system can actively learn which renderings in the AR system 180 induce the operator to be vigilant and thus, adjust the displays accordingly.

Continuing with the discussion of the vigilance system 170 of FIG. 2, the rendering module 240, in one embodiment, generally includes instructions that function to control the processor 110 to render graphical elements within a display of the AR system 180 as a function of the engagement level. That is, the rendering module 240 reacts to how engaged the operator is with the present operating environment of the vehicle 100 by rendering graphical elements within the AR system 180 to induce the operator to be engaged with the vehicle 100 and the present operating environment. For example, the rendering module 240 tailors the graphical elements to engage the operator and induce the operator to respond by engaging the vehicle 100 and transitioning from distracted tasks to being situationally aware and ready to control the vehicle 100 and/or intervene in control of the vehicle 100. Thus, the rendering module 240 can intensify/escalate how the graphical elements within the AR display are presented according to a particular engagement level. In one embodiment, the rendering module 240 renders the graphical elements by adjusting an opacity of the graphics, flashing the graphics or otherwise adjusting an animation, varying colors, rendering additional graphics, rendering arrows to direct the attention of the operator, rendering text including instructions and/or questions to the operator, rendering overlays on objects (e.g., cartoon animations, avatars, etc.), and so on.

In further aspects, the rendering module 240 can analyze or otherwise electronically mine information from other vehicle systems (e.g., the sensor system 120, navigation system 147, autonomous module 160) about the vehicle 100 to determine aspects about the present operating environment which can be related to the operator through the AR system 180. The rendering module 240 uses the mined information to render the graphical elements as active content that relates directly to the present operating environment of the vehicle 100. In other words, the rendering module 240 renders the graphical elements to inform a situational awareness of the operator and to engage the operator with the present operating environment. For example, the rendering module 240 can render the graphical elements to depict and graphically identify hazards, planned and/or projected driving paths, other vehicles, predicted movements of the other vehicles/objects, and so on.

In still further embodiments, the rendering module 240 renders complex graphical overlays that illustrate visualizations of information about the present operating environment as perceived via one or more sensors (e.g., LIDAR 124), from internal state information of the autonomous module 160, and so on. Thus, the rendering module 240 can produce an immersive visual environment through the AR system 180 that displays graphics about object tracks, current speeds and headings, predicted maneuvers of the vehicle 100 and other vehicles, assessments of hazards, navigational path information, autonomous path planning and object avoidance information, object detection and tracking, and so on. In one example, the rendering module 240 translates 3D point clouds produced by the LIDAR 124 into graphical overlays of the present operating environment such that objects perceived by the LIDAR 124 are overlaid with data points from scans of the LIDAR 124. Similarly, the rendering module 240 can use data from volumetric scans by the radar 123 and/or data from other sensors to produce animated/graphical overlays and add additional information as graphical elements to visuals through by the AR system 180.

Additionally, the rendering module 240 can also render infotainment graphical elements including local points of interest, trivia relating to a present location or nearby elements, and so on. In another embodiment, the rendering module 240 can additionally or alternatively render graphical elements within the present operating environment through the AR system 180 as part of an interactive game with the operator. For example, the rendering module 240 can render targets, game icons, and other game style graphics. In one embodiment, the rendering module 240 renders graphics for a first-person interactive style of game, a real-time strategy game, and so on. Moreover, the rendering module 240, in one embodiment, controls audio within the vehicle 100 to provide alerts, chimes, speech, music and other sounds in combination with rendering the graphical elements.

It should be appreciated that the rendering module 240 can produce many different graphical elements within one or more displays (e.g., front, side, rear, head-mounted) of the AR system 180. However, regardless of the particular graphical elements, the rendering module 240 renders the graphics as a function of how engaged the operator is with the present operation of the vehicle 100, as indicated by the engagement level. Thus, the rendering module 240 functions to dynamically generate content with the AR system 180 according to the engagement level to induce greater vigilance and readiness within the operator and/or to maintain the vigilance/readiness of the operator. Thus, the rendering module 240 dynamically adjusts which graphical elements are rendered, how the graphical elements are rendered, where the graphical elements are rendered, and so on in a manner that induces vigilance/readiness in the operator and avoids difficulties associated with the vigilance decrement.

Figure 3:
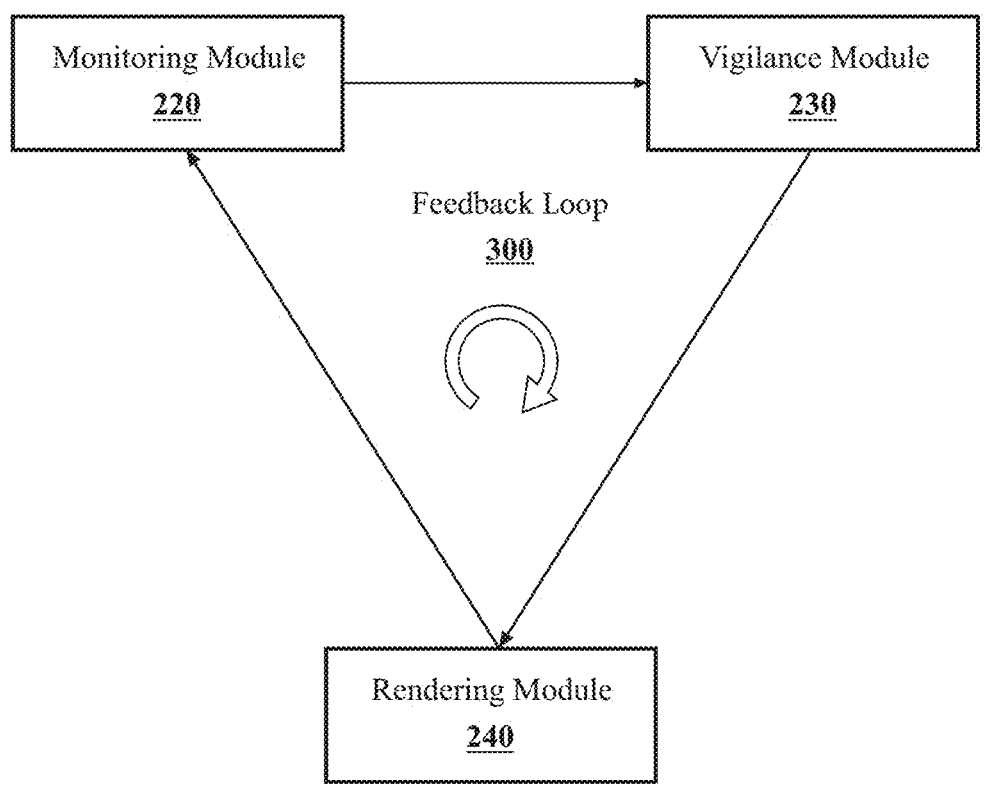
FIG. 3 illustrates a schematic of a feedback loop between elements of the vigilance system of FIG. 2.

As a further illustration of dynamic aspects relating to how the vigilance system 170 executes to adjust and update the AR system 180, the discussion will now transition to FIG. 3 and feedback loop 300. The feedback loop 300 generally illustrates one embodiment of how the rendering module 240, the vigilance module 230, and the monitoring module 220 execute in parallel to render the graphical elements according to the engagement level of the operator, and how the engagement level changes as the rendering module 240 renders the graphical elements to induce responses within the operator. Thus, as the autonomous driving module 160 autonomously controls the vehicle 100 according to SAE level 2 autonomy, consider that an initial engagement level of the operator indicates that the operator is likely not engaged and is instead distracted by infotainment or other tasks. Thus, the monitoring module 220 may indicate that a gaze of the operator is directed away from a windshield of the vehicle 100 for an extended period or repetitively toward aspects of the vehicle 100 that are unrelated to operating the vehicle 100. In response to the monitoring module 220 collecting the operator state information 260 about the gaze of the operator and the vigilance module 230 computing the engagement level that indicates this circumstance, the rendering module 240 controls the AR system 180 to present one or more graphical elements.

For purposes of this discussion, consider that the rendering module 240 renders a complete overlay onto a primary AR display of the AR system 180 that includes graphics with a high opacity and that display sensor information, internal state information from the autonomous driving module 160, navigation paths, object tracks, and other information in graphical form related to a situational awareness. Thus, the AR display transitions from displaying, for example, relatively minimal graphical elements and generally providing a clear/translucent view of the real-world to being relatively highly animated with the noted elements that provide for an immersive experience for the operator with many informational elements, colors, and so on. Accordingly, the monitoring module 220 continues to collect information and produce the operator state information 260 in an updated form, while the vigilance module 230 updates the engagement level to reflect a response exhibited by the operator. Moreover, presume that the renderings provided by the rendering module 240 initially induced the operator to intently view the AR display. Thus, the monitoring module 220 captures this reaction using, for example, the cameras 126 executing an eye-tracking routine.

As such, the vigilance module 230 updates the engagement level which then causes the rendering module 240 to, for example, maintain the present graphical elements for a period of time so that the engagement level of the operator is sustained and does not begin to decline. However, after a defined period lapses with the operator remaining engaged, the rendering module 240 can adjust a number, variety, intensity, opacity, and/or other aspects of the graphics in order to, for example, avoid over stimulating the operator and/or to provide the operator with a more translucent image so that the operator can develop situational awareness and vigilance about the present operating environment outside of the AR system 180. However, should the engagement level of the operator begin to creep back toward being disengaged, the vigilance system 170 can adjust the rendering of the graphics appropriately as identified through the feedback loop 300.

Figure 4:
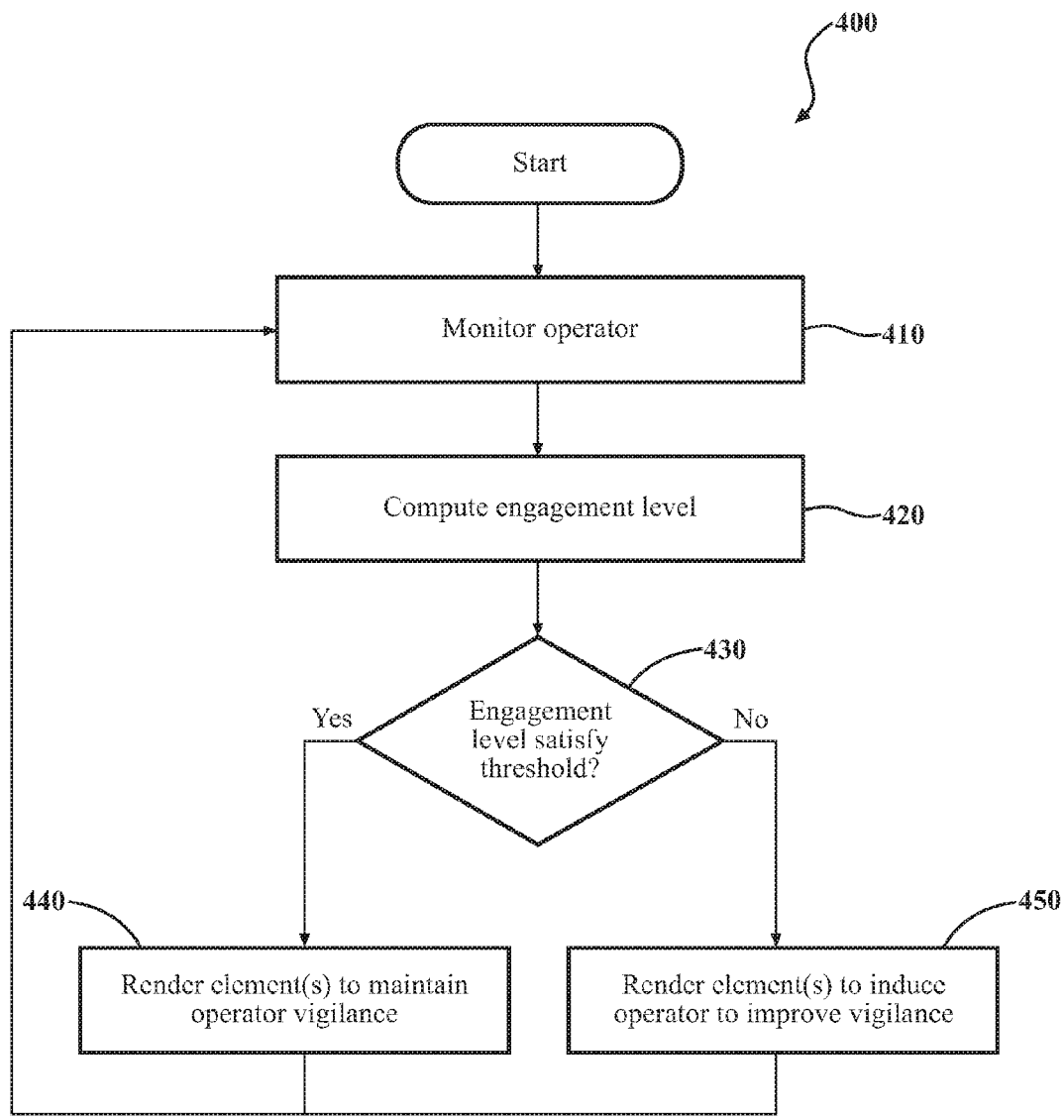
FIG. 4 illustrates one embodiment of a method that is associated with rendering elements within an AR system to engage a vehicle operator and thereby maintain vigilance and readiness of the vehicle operator.

Additional aspects of mitigating vigilance decrement using augmented reality to display dynamic graphical elements according to an engagement level will be discussed in relation to FIG. 4. FIG. 4 illustrates a flowchart of a method 400 that is associated with mitigating vigilance decrement for a vehicle operator. Method 400 will be discussed from the perspective of the vigilance system 170 of FIGS. 1 and 2. While method 400 is discussed in combination with the vigilance system 170, it should be appreciated that the method 400 is not limited to being implemented within the vigilance system 170, but is instead one example of a system that may implement the method 400.

As an initial matter, it should be noted that the disclosed functionality of monitoring at 410, computing at 420, and rendering at 440 and 450 generally occurs in parallel and forms a feedback loop to iteratively compute the engagement level and adjust the rendering of the at least one graphical element according to the vigilance/readiness induced in the operator. Thus, the described method 400, in one embodiment, includes multiple parallel processes that function to mitigate vigilance decrement and improve readiness of the operator while the vehicle 100 is operating according to, for example, SAE level 2 autonomy or another level of autonomy during which the operator may become distracted. Moreover, in one embodiment, the method 400 is generally implemented to maintain the vigilance of the operator with respect to supervising the autonomous operation of the vehicle 100 and readiness of the operator to provide manual control inputs when the vehicle 100 performs a handover to the operator. In this way, the method 400 can avoid difficulties associated with the vigilance decrement and otherwise disengaged operators by inducing the operator to maintain an awareness of the present operating environment and progress of the vehicle through the present operating environment.

At 410, the monitoring module 220 monitors the operator by collecting operator state information 260. As previously mentioned, the monitoring module 220 acquires the data that comprises the operator state information 260 from sensors of the vehicle 100 by either actively querying the respective sensors or by passively sniffing the data from communications or electronic storage. The monitoring module 220 can then format or otherwise provide the collected data in an ordered manner and electronically store the operator state information 260 in the database 250 or the memory 210 for use by the vigilance module 230. In one embodiment, the monitoring module 220 can collect the operator state information from any sensors that are included within the vehicle 100. Thus, the operator state information 260, as previously discussed, can generally include a wide variety of information about the operator.

For example, the monitoring module 220 can control one or more cameras (e.g., cameras 126) that are disposed within an interior passenger compartment of the vehicle 100 to track eye movements of the operator. The eye movements, otherwise referred to as eye tracks, of the operator are useful in determining whether the operator is gazing at objects in front of the vehicle 100, within the passenger compartment, and so on. Thus, the eye tracks are informative with respect to whether the operator is actively engaged with the present operating environment of the vehicle. Moreover, the monitoring module 220 can use the cameras 126 to track pupil dilation, rates of eye movements, and further information about the operator. In one embodiment, the gaze and/or eye tracks of the operator can be a sole source of information for the operator state information 260 from which the vigilance module 230 computes the engagement level. In either case, the monitoring module 220 generates the operator state information 260, in one embodiment, on an on-going basis to maintain an up-to-date characterization of the present activities/focus of the operator.

At 420, the vigilance module 230 computes an engagement level of the operator. In one embodiment, the vigilance module 230 uses the operator state information 260 collected at 410 to characterize an extent of vigilance decrement presently experienced by the operator. In other words, the engagement level is a characterization of how vigilant the operator presently is in relation to aspects relating to supervising the autonomous operation of the vehicle 100 through the present operating environment. Thus, the engagement level also characterizes the situational awareness of the operator and the readiness of the operator to assume control of the vehicle 100 should the autonomous driving module 160 cease autonomous operation of the vehicle and execute a handover to manual control.

Furthermore, the vigilance module 230, in one embodiment, computes the engagement level according to the vigilance model 270. As noted previously, the vigilance model 270 is, in one embodiment, a statistical model that characterizes a likely engagement of the operator including a likely vigilance decrement of the operator as a function of indicia (e.g., the operator state information 260) about the operator. Thus, the vigilance model 270 can output a statistical likelihood as the engagement level that indicates a degree to which the operator is engaged with the present operating environment.

In further aspects, the vigilance module 230 also considers dynamic vehicle data along with the operator state information 260 to account for particularities of the present operating environment when computing the engagement level. That is, the vigilance module 230 can adjust the provided likelihood according to whether a present segment of roadway is particularly boring, whether additional passengers are present to distract the operator, whether scenic vistas are likely to distract the operator, whether outside temperatures are hot and the operator is uncomfortable, whether a fuel level of the vehicle is approaching empty, and so on. In general, the present disclosure envisions considering any circumstances for which data can be ascertained and used to inform the vigilance system 170. Thus, the foregoing examples are intended as a discussion of possible data elements and should not be construed as a limited listing.

While the vigilance model 270 is discussed along with method 400 from a heuristic perspective, in further embodiments and as previously indicated, the vigilance model 270 along with the vigilance module 230 can implement a machine learning algorithm to learn correlations between the operator state information 260, vehicle dynamics data, and other collected data indicators in order to compute the engagement level. In either case, the engagement level generated at 420 informs the vigilance system 170 about a current state of the operator in relation to engagement with the operation of the vehicle 100.

At 430, the rendering module 240 determines whether the engagement level satisfies a threshold. In one embodiment, the threshold indicates a minimum engagement of the operator to be considered vigilant and ready to manually control the vehicle 100. It should be noted that while a threshold determination is discussed, in further implementations, the rendering module 240 can assess the present engagement level on a sliding scale or according to a further manner of classification.

For example, in one embodiment, at 430, the rendering module 240 determines whether the engagement level has changed since a previous assessment. Accordingly, the rendering module 240 can compare a current engagement level with a previous engagement level to determine a positive change (e.g., the operator is more engaged), a negative change (e.g., the operator is less engaged), or no change. In further aspects, the rendering module 240 can analyze a trend in the engagement level over a plurality of assessments at 430. As such, depending on the trend of the engagement level, the rendering module 240 can maintain the degree of rendering for the graphical elements as discussed further at block 440 or adjust the rendering of the graphical elements as discussed at 450.

At 440, the rendering module 240 renders at least one graphical element on an AR display to maintain an engagement of the operator. In one embodiment, the rendering module 240 maintains the engagement of the operator by continuing to render one or more elements within the AR display of the AR system 180 according to the same manner as previously performed. That is, if the operator is presently vigilant and engaged with the vehicle 100, then the rendering module 240 can continue rendering the graphics in a similar manner, or, in one embodiment, reduce an intensity or other characteristic of the graphics if previously intensified to gain the attention of the operator.

At 450, the rendering module 240 renders one or more graphical elements within the AR display to induce the operator to improve vigilance about the present operation of the vehicle 100. That is, when the rendering module 240 determines that the engagement level for the operator is not sufficient, trending downward, or otherwise inadequate for a present operating environment of the vehicle 100, the rendering module 240 induces behaviors/reactions within the operator by rendering various graphical elements on the AR display in a manner that is designed to engage the operator with the operation of the vehicle 100. Thus, in various embodiments, the rendering module 240 can achieve the goal of inducing the operator to engage the vehicle 100 and become more vigilant in many different ways.

Accordingly, by way of example, the rendering module 240 can render an overlay of graphics depicting sensor data onto the AR display, render graphics depicting internal state information of an autonomous driving module 160, render an overlay with varying opacity according to the engagement level, render a varying a number of graphic elements according to the engagement level or changes to the engagement level over time, render graphical elements within a line-of-sight of the operator in the AR display, render text within the AR display that includes questions for the operator about aspects of the present operating environment perceived by the at least one sensor of the vehicle, and so on. Further examples and aspects of the content rendered in the AR system 180 will be discussed in relation to FIGS. 5-10 subsequently.

As an additional matter, while the rendering module 240 is discussed as performing the functionality of rendering various graphics on displays of the AR system 180, in various embodiments, the rendering module 240 can control the AR system 180 to render the graphics according to various electronic instructions communicated to the AR system 180 by the rendering module 240.

Figure 5:
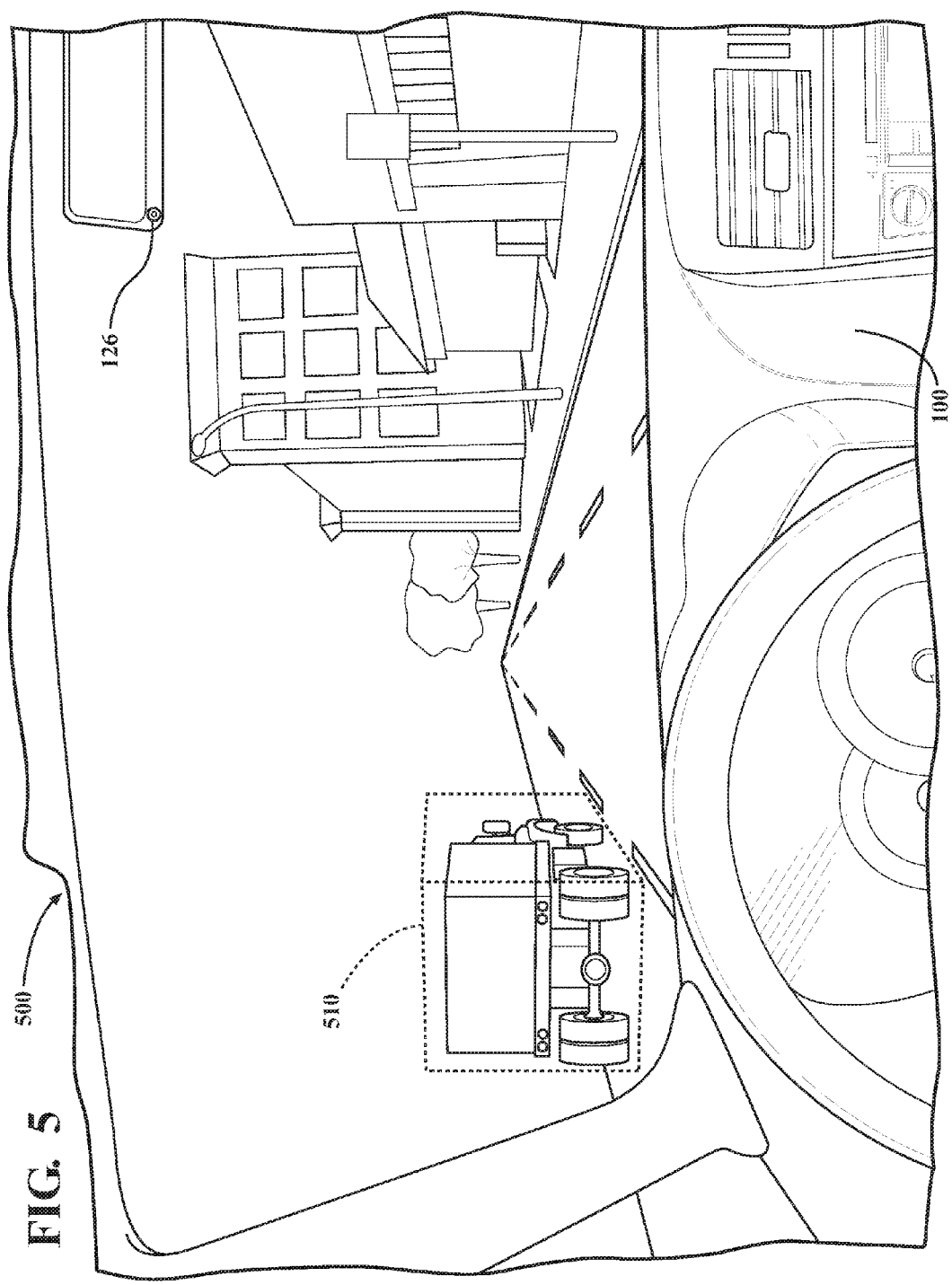
FIG. 5 illustrates an interior view of a vehicle and elements displayed within an AR system.

As further illustration of how the vigilance system 170 adapts the displays of the AR system 180 according to the engagement level, consider FIGS. 5-10. FIG. 5 is a forward-facing view 500 from inside of the vehicle 100 looking through a windshield of the vehicle 100 and through an AR display of the AR system 180. Thus, the view 500 depicts rendered graphics produced by the rendering module 240 according to an engagement level of the operator. As shown in FIG. 5, the vigilance system 170 considers the engagement level of the operator to be adequate and thus renders a dashed box 510 around a truck in order to highlight the truck within the AR display. Thus, FIG. 5 includes a single graphical element rendered by the rendering module 240 since the operator is adequately engaged and, thus, aware of operating aspects of the vehicle 100 and the present operating environment.

Figure 6:
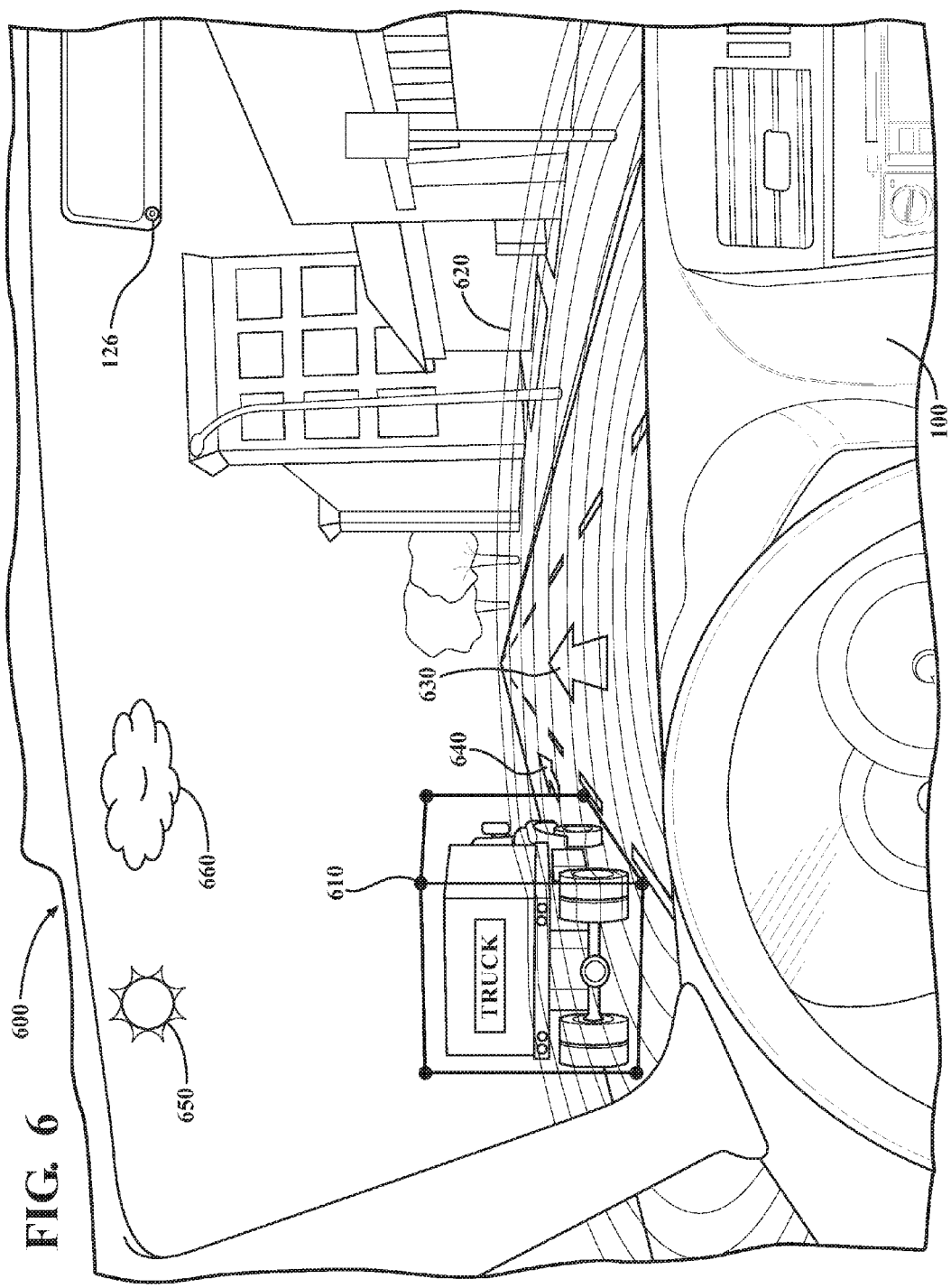
FIG. 6 illustrates an interior view of a vehicle that is similar to the view of FIG. 5 but is illustrated with further elements displayed within an AR system.

By contrast, FIG. 6 illustrates an alternative view 600 of the view 500 from FIG. 5. As shown in FIG. 6, the vigilance system 170 is rendering multiple different graphics including overlays within the view 600 through the AR system 180 in order to improve the vigilance of the operator. Thus, the view 600 includes an outline box 610 to highlight the truck that is an embellished form of the box 510 of FIG. 5. Furthermore, the view 600 is illustrated with sensor overlay 620 that depicts perceived data points from the LIDAR 124 rendered within the AR display. Additionally, the view includes trajectory arrows 630 and 640 that denote a general heading for the truck and the vehicle 100. Lastly, the view 600 depicts animated weather information 650 and 660 illustrating a sun and cloud, respectively. The weather information generally depicts, for example, expected weather conditions for the present day.

Figure 7:
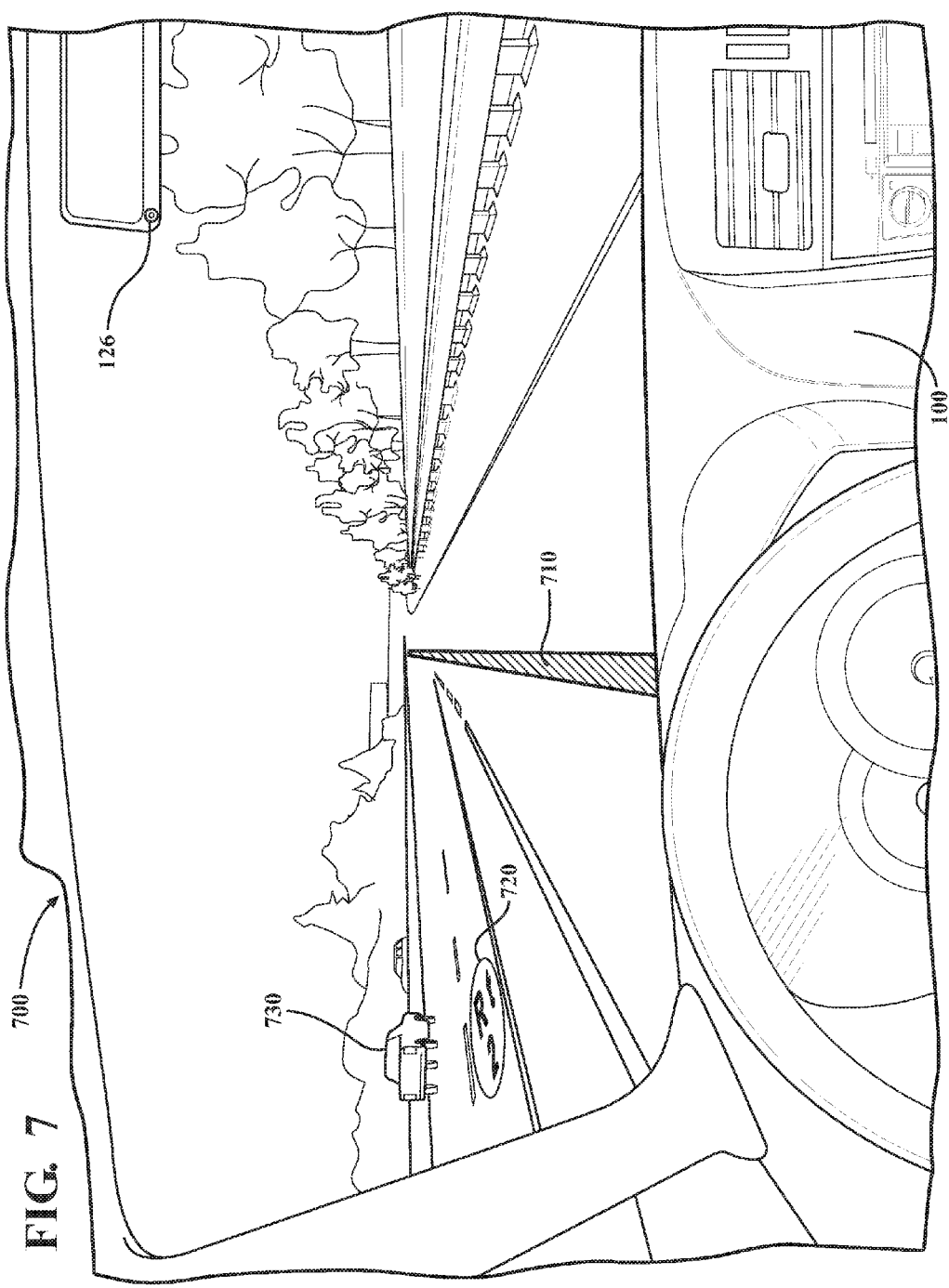
FIG. 7 illustrates an interior view of a vehicle and elements displayed within an AR system.
Figure 8:
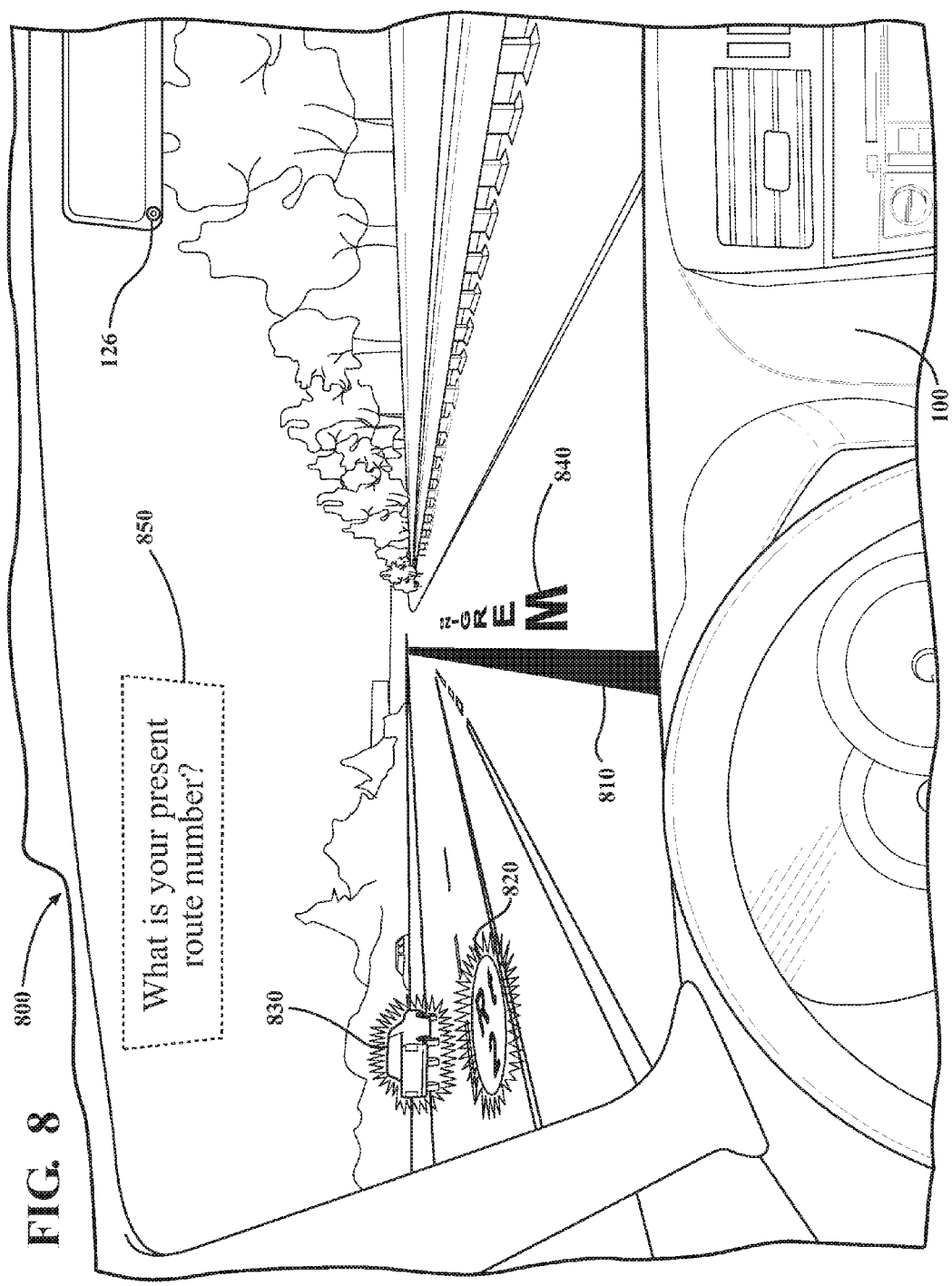
FIG. 8 illustrates an interior view of a vehicle that is similar to the view of FIG. 7 but is illustrated with further elements to engage an operator with vigilance decrement.

As a further example of different ways in which the vigilance system 170 can render graphical elements to engage the operator, consider FIGS. 7 and 8. FIG. 7 illustrates a view 700 from within the vehicle 100 that is of a roadway in front of the vehicle 100 and various dynamic and static objects in the present operating environment. For example, the view 700 is rendered to include a path 710 of the vehicle 100 as a line on the roadway in front of the vehicle 100. Additionally, the view includes a roadway identifier 720 for the roadway onto which the vehicle 100 is merging. As an additional note, vehicle 730 is not rendered with any additional graphical elements but is instead provided as a standard real-world element without any modification through the AR system 180.

Turning to the view 800 of FIG. 8, additional elements are illustrated in the view 800 in comparison to the view 700. For example, the vigilance system 170 renders the additional elements with glowing, flashing, or more intense visual impact when the operator is not engaged with the vehicle 100 and is instead, for example, using a personal electronic device, performing another distracting activity, or, more generally, suffering from vigilance decrement. The path 810 is illustrated with more intense coloration than the path 710 from FIG. 7. Moreover, additional text 840 that describes present actions and internal state information of the autonomous driving module 160 is also rendered within the AR display. A route identifier 820 and a vehicle 830 are illustrated with glowing colors in the view 800. As an additional example, the vehicle 100 uses one or more sensors to identify the route number and then renders a question to the operator as a graphic text element 850 displayed floating in the sky in front of the vehicle 100. As such, the operator can respond to the question using voice commands or another form of input at which point the vigilance system 170 can remove the text or proceed to present further questions depending on changes to the engagement level of the operator. In this way, the vigilance system 170 adjusts how graphics are rendered in the AR display to further engage the operator.

Figure 9:
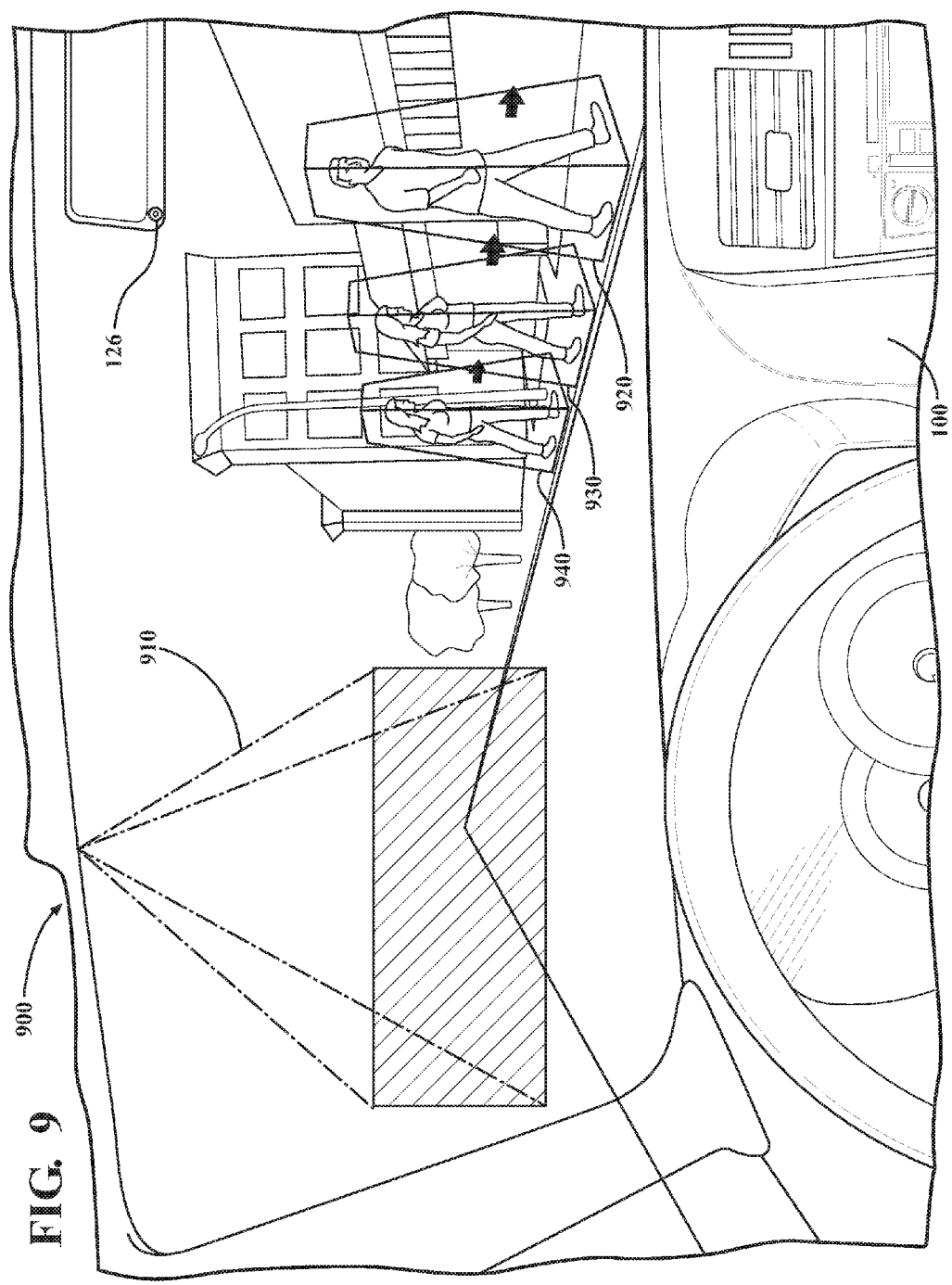
FIG. 9 illustrates an interior view of a vehicle and elements displayed within an AR system.

An additional example is illustrated in FIG. 9, which shows a similar forward-facing view from the vehicle 100. However, the view 900 illustrates a volumetric scan region 910 for data provided via a radar sensor 123. The region 910 is rendered to inform the operator of where the radar 123 is presently scanning. Additionally, detected objects 920, 930, and 940 are outlined with graphic boxes and arrows to show they have been detected and also to show associated trajectories of the objects 920, 930, and 940 do not intersect with the vehicle 100.

Figure 10:
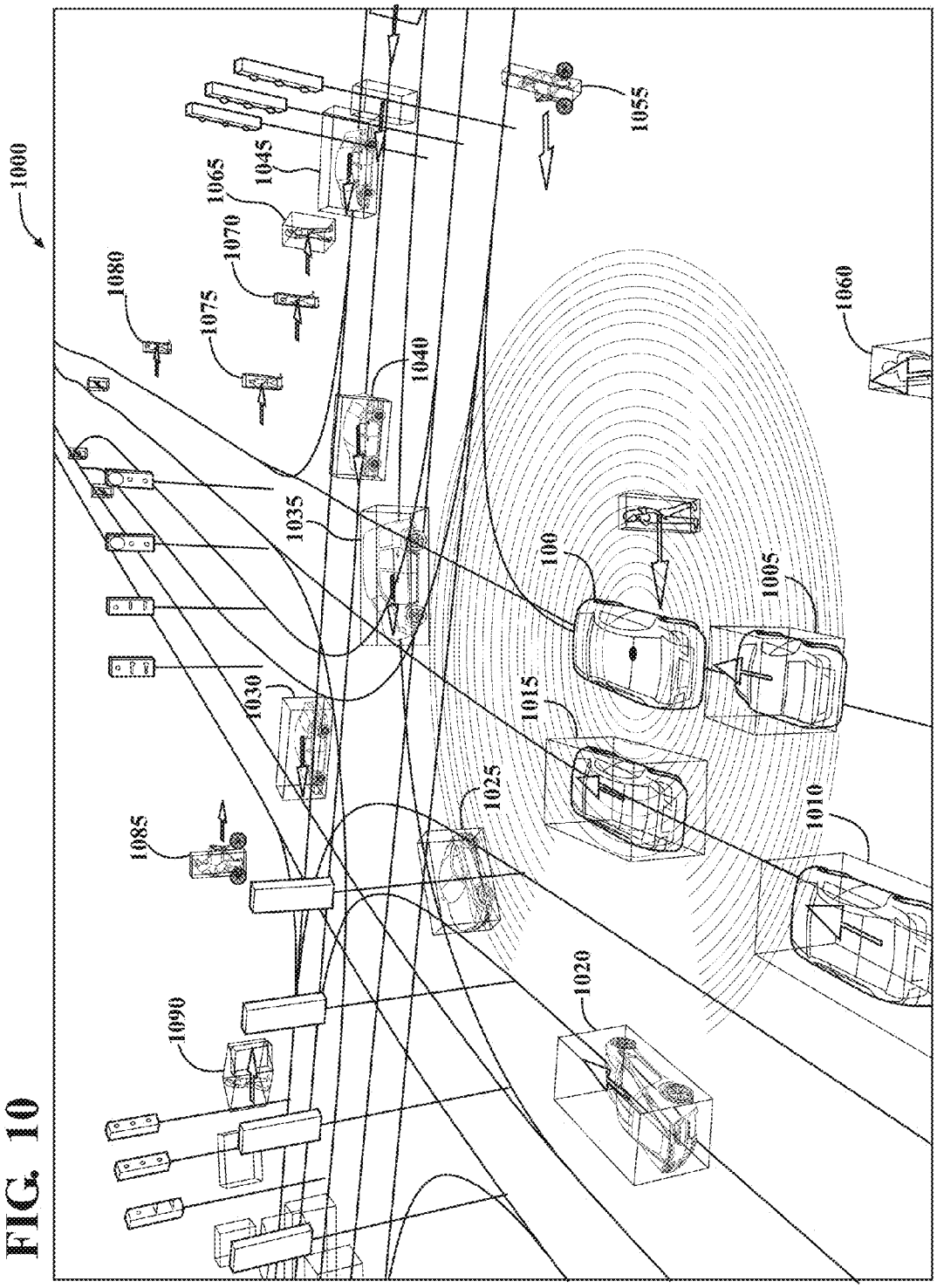
FIG. 10 illustrates an aerial view of a vehicle and elements within a surrounding environment as rendered for display within an AR system.

FIG. 10 illustrates a rear-aerial view 1000 of a present operating environment of the vehicle 100 that is rendered with augmented reality (AR) graphics. That is, the aerial view 1000 is not necessarily a view that would be presented to the operator of the vehicle 100 but is instead provided as a representative rendering of how the vigilance system 170 can control the AR system 180 and how the present operating environment of the vehicle 100 can be rendered around the vehicle 100 depending on which direction the operator is presently gazing. Thus, as shown in FIG. 10, the present operating environment is illustrated as being rendered with multiple different graphical elements. In general, the view 1000 is comprised of sensor data from, for example, the Lidar 124 in an overlay texture that is pervasive throughout the view 1000 and illustrates how the Lidar 124 perceives various objects and surfaces. Moreover, various tracking information for the objects is also rendered within the view 1000 to provide insights to the operator about internal decision making of the autonomous driving module 160. Additionally, objects 1005-1045 are vehicles that are illustrated with outline boxes to show they have been detected by the vehicle 100 and are also shown with graphical elements depicting information about respective trajectories. Furthermore, objects 1050-1090 are detected objects in the environment that are similarly rendered with various graphics to convey situational information about the objects 1050-1090.

As an additional note, the view 1000 represents an example that is relatively highly rendered with graphical elements. Thus, segments of the view 1000 from perspectives within the vehicle 100 may be provided to the operator when, for example, the vigilance system 170 determines the operator is not adequately engaged. Moreover, the vigilance system 170 may render the graphic elements in a more translucent form when the operator becomes further engaged with the vehicle 100.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s)

110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vigilance system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vigilance system 170, and/or the autonomous driving module(s) 160 may control some or all of these vehicle systems 140 and, thus, may be partially or fully autonomous.

The processor(s) 110, the vigilance system 170, and/or the autonomous driving module(s) 160 can be operably connected to communicate with the various vehicle systems 140 and/or individual components thereof. For example, returning to FIG. 1, the processor(s) 110, the vigilance system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vigilance system 170, and/or the autonomous driving module(s) 160 may control some or all of these vehicle systems 140.

The processor(s) 110, the vigilance system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vigilance system 170, and/or the autonomous driving module(s) 160 can control the direction and/or speed of the vehicle 100. The processor(s) 110, the vigilance system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vigilance system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vigilance system for mitigating vigilance decrement of an operator in a vehicle, comprising:
   one or more processors;
   a memory communicably coupled to the one or more processors and storing:
   a monitoring module including instructions that when executed by the one or more processors cause the one or more processors to monitor the operator by collecting operator state information using at least one sensor of the vehicle;
   a vigilance module including instructions that when executed by the one or more processors cause the one or more processors to compute an engagement level of the operator according to a vigilance model and the operator state information to characterize an extent of vigilance decrement presently experienced by the operator; and
   a rendering module including instructions that when executed by the one or more processors cause the one or more processors to render, on an augmented reality (AR) display in the vehicle, at least one graphical element as a function of the engagement level by dynamically adjusting characteristics of how the at least one graphical element is rendered according to at least changes in the engagement level to induce vigilance within the operator with respect to autonomous operation of the vehicle and a present operating environment around the vehicle, and to facilitate preventing the operator from becoming disengaged from the autonomous operation and the present operating environment,
   wherein the rendering module further includes instructions to render the at least one graphical element by generating the at least one graphical element from sensor data about the present operating environment that is external to the vehicle,
   wherein the monitoring module, the vigilance module, and the rendering module execute on the one or more processors in parallel using a feedback loop to dynamically update the operator state information, to iteratively compute the engagement level and to adjust the rendering of the at least one graphical element according to changes observed in the engagement level,
   wherein the rendering module further includes instructions to render the at least one graphical element by rendering the at least one graphical element with visual characteristics that are varied based, at least in part, on the changes in the engagement level over time, wherein the visual characteristics that are varied include at least an intensity of a graphical overlay of the present operating environment,
   wherein the vehicle is operating according to at least a supervised autonomy standard while the monitoring module, the vigilance module, and the rendering module are executing in parallel, and wherein the rendering module further includes instructions to render the at least one graphical element to maintain readiness of the operator for when the vehicle performs a handover of manual control to the operator by providing visual cues to the operator through changing the at least one graphical element.

2. The vigilance system of claim 1, wherein the rendering module further includes instructions to render the at least one graphical element by rendering visualizations within the AR display using the sensor data about the present operating environment from one or more environmental sensors—of the vehicle as the graphical overlay on the AR display,
   wherein the rendering module further includes instructions to render the at least one graphical element by rendering internal state information of an autonomous driving module that indicates present decisions and situational awareness of the autonomous driving module about the present operating environment.

3. The vigilance system of claim 1, wherein the vigilance decrement indicates an extent to which the operator is aware of the present operating environment and autonomous operation of the vehicle through the present operating environment,
   wherein the vigilance module further includes instructions to compute the engagement level by analyzing dynamic vehicle data along with the operator state information to account for the present operating environment of the vehicle in the engagement level, wherein the dynamic vehicle data includes at least telematics of the vehicle, a current location of the vehicle, and weather information, and wherein the engagement level indicates a present mental awareness of the operator in relation to the autonomous operation of the vehicle and the present operating environment.

4. The vigilance system of claim 1, wherein the monitoring module further includes instructions to monitor the operator by collecting at least gaze data from an eye-tracking camera that identifies a direction in which the operator is presently gazing, wherein the gaze data further includes an eye track that identifies a path of where the operator has been gazing over a period of time,
   wherein the vigilance module further includes instructions to compute the engagement level by generating the engagement level as a statistical likelihood that the operator is engaged with the present operating environment, and wherein the vigilance model is a statistical model that characterizes a likely vigilance decrement of the operator as a function of the operator state information and the present operating environment.

5. The vigilance system of claim 1, wherein the vigilance module further includes instructions to update the vigilance model according to the operator state information and induced responses observed of the operator in response to the at least one graphical element to customize the rendering according to the operator.

6. The vigilance system of claim 1, wherein the rendering module further includes instructions to render the at least one graphical element by one or more of:
   (i) varying an opacity of the graphical overlay within the AR display according to the changes in the engagement level, (ii) varying a number of graphical elements displayed within the AR display according to the changes in the engagement level, (iii) rendering the at least one graphical element within a line-of-sight of the operator in the AR display according to the changes in the engagement level, and (v) rendering text within the AR display that includes questions for the operator about aspects of the present operating environment perceived by the at least one sensor of the vehicle when the engagement level indicates that the operator is experiencing vigilance decrement.

7. The vigilance system of claim 1, wherein the rendering module further includes instructions to render the at least one graphical element by rendering point cloud data from a LIDAR sensor of the vehicle as the graphic overlay within the AR display.

8. A non-transitory computer-readable medium for mitigating vigilance decrement of an operator in a vehicle and storing instructions that when executed by one or more processors cause the one or more processors to:

monitor the operator by collecting operator state information using at least one sensor of the vehicle;

compute an engagement level of the operator according to a vigilance model and the operator state information to characterize an extent of vigilance decrement presently experienced by the operator; and render, on an augmented reality (AR) display in the vehicle, at least one graphical element as a function of the engagement level by dynamically adjusting characteristics of how the at least one graphical element is rendered according to at least changes in the engagement level to induce vigilance within the operator with respect to autonomous operation of the vehicle and a present operating environment around the vehicle, and to facilitate preventing the operator from becoming disengaged from the autonomous operation and the present operating environment, wherein the instructions to render the at least one graphical element include instructions to generate the at least one graphical element from sensor data about the present operating environment that is external to the vehicle, wherein the instructions to render the at least one graphical element include instructions to render the at least one graphical element with visual characteristics that are varied based, at least in part, on the changes in the engagement level over time, and as a graphical overlay of the present operating environment that is varied in intensity according to the changes in the engagement level, wherein the instructions to monitor, compute, and render execute on the one or more processors in parallel using a feedback loop to dynamically update the operator state information, to iteratively compute the engagement level, and to adjust the rendering of the at least one graphical element according to the changes observed in the engagement level, wherein the vehicle is operating according to at least a supervised autonomy standard while the instructions to monitor, compute, and render execute on the one or more processors in parallel, and wherein the instructions to render the at least one graphical element maintain readiness of the operator for when the vehicle performs a handover of manual control to the operator by providing visual cues to the operator through changing the at least one graphical element.

9. The non-transitory computer-readable medium of claim 8, wherein the instructions to monitor the operator further include instructions to collect at least gaze data from an eye-tracking camera that identifies a direction in which the operator is presently gazing, wherein the gaze data further includes an eye track that identifies a path of where the operator has been gazing over a period of time, wherein the instructions to compute the engagement level further include instructions to generate the engagement level as a statistical likelihood that the operator is engaged with the present operating environment, and wherein the vigilance model is a statistical model that characterizes a likely vigilance decrement of the operator as a function of the operator state information and the present operating environment.

10. The non-transitory computer-readable medium of claim 8, wherein the the instructions to render the at least one graphical element include instructions to render visualizations within the AR display by adjusting the at least one graphical element according to the engagement level using data about the present operating environment from one or more environmental sensors of the vehicle as the graphical overlay on the AR display, wherein the instructions to render the at least one graphical element include instructions to render internal state information of an autonomous driving module that indicates present decisions and situational awareness of the autonomous driving module about the present operating environment, and wherein the autonomous driving module controls the vehicle according to the supervised autonomy standard that defines operation of the vehicle using at least supervised autonomy.

11. The non-transitory computer-readable medium of claim 8, wherein the instructions to render the at least one graphical element further include instructions to render point cloud data from a LIDAR sensor of the vehicle as the graphical overlay within the AR display.

12. A method of mitigating vigilance decrement of an operator in a vehicle with an augmented reality (AR) display, comprising:

monitoring the operator by collecting operator state information using at least one sensor of the vehicle;

computing an engagement level of the operator according to a vigilance model and the operator state information to characterize an extent of vigilance decrement presently experienced by the operator; and rendering, on the AR display, at least one graphical element as a function of the engagement level by dynamically adjusting characteristics of how the at least one graphical element is rendered according to at least changes in the engagement level to induce vigilance within the operator with respect to autonomous operation of the vehicle and a present operating environment around the vehicle, and to facilitate preventing the operator from becoming disengaged from the autonomous operation and the present operating environment, wherein rendering the at least one graphical element includes generating the at least one graphical element from sensor data about the present operating environment that is external to the vehicle, wherein monitoring the operator, computing the engagement level, and rendering the at least one graphical element execute in parallel using a feedback loop of updated operator state information from the at least one sensor to iteratively compute the engagement level and adjust the rendering of the at least one graphical element according to the vigilance induced in the operator, wherein rendering the at least one graphical element includes rendering the at least one graphical element with visual characteristics that are varied based, at least in part, on the changes in the engagement level over time, and as a graphical overlay of the present operating environment that is varied in intensity according to the changes in the engagement level, wherein the vehicle is operating according to at least a supervised autonomy standard while the monitoring, computing, and rendering are executing in parallel, and wherein rendering the at least one graphical element maintains readiness of the operator for when the vehicle performs a handover of manual control to the operator by providing visual cues to the operator through changing the at least one graphical element.

13. The method of claim 12, wherein the vigilance decrement indicates an extent to which the operator is aware of the present operating environment and progress of the vehicle through the present operating environment, wherein computing the engagement level further includes analyzing dynamic vehicle data along with the operator state information to account for the present operating environment of the vehicle when computing the engagement level, wherein the dynamic vehicle data includes at least telematics of the vehicle, a current location of the vehicle, and weather information and wherein the engagement level indicates a present mental awareness of the operator in relation to the autonomous operation of the vehicle and the present operating environment.

14. The method of claim 12, wherein monitoring the operator includes collecting at least gaze data from an eye-tracking camera that identifies a direction in which the operator is presently gazing, wherein the gaze data further includes an eye track that identifies a path of where the operator has been gazing over a period of time, wherein computing the engagement level includes generating the engagement level as a statistical likelihood that the operator is engaged with the present operating environment, and wherein the vigilance model is a statistical model that characterizes a likely vigilance decrement of the operator as a function of the operator state information according to the present operating environment.

15. The method of claim 12, further comprising:

updating the vigilance model according to the operator state information and induced responses observed of the operator according to the rendering of the at least one graphical element to customize the rendering according to the operator.

16. The method of claim 12, wherein rendering the at least one graphical element further includes rendering visualizations within the AR display by adjusting the at least one graphical element according to the engagement level using data about the present operating environment from one or more environmental sensors of the vehicle as the graphical overlay on the AR display, wherein rendering the at least one graphical element further includes rendering internal state information of an autonomous module that indicates present decisions and situational awareness of the autonomous module about the present operating environment, and wherein the autonomous module controls the vehicle according to an autonomous driving standard for operating according to at least supervised autonomy.

17. The method of claim 12, wherein rendering the at least one graphical element as a function of the engagement level further includes one or more of:

(i) varying an opacity of an overlay within the AR display according to the changes of the engagement level, (ii) varying a number of graphic elements displayed within the AR display according to the changes in the engagement level, (iii) adding additional elements within a line-of-sight of the operator in the AR display according to the changes in the engagement level, (iv) rendering point cloud data from a LiDAR sensor of the vehicle as the graphical overlay within the AR display when the engagement level indicates that the operator is experiencing vigilance decrement, and (v) rendering text within the AR display that includes questions for the operator about aspects of the present operating environment perceived by the at least one sensor of the vehicle when the engagement level indicates that the operator is experiencing vigilance decrement.

* * * * *